R. W. RYON.
HOG WATERING APPARATUS.
APPLICATION FILED AUG. 16, 1917.
1,254,937.
Patented Jan. 29, 1918.
2 SHEETS—SHEET 2.
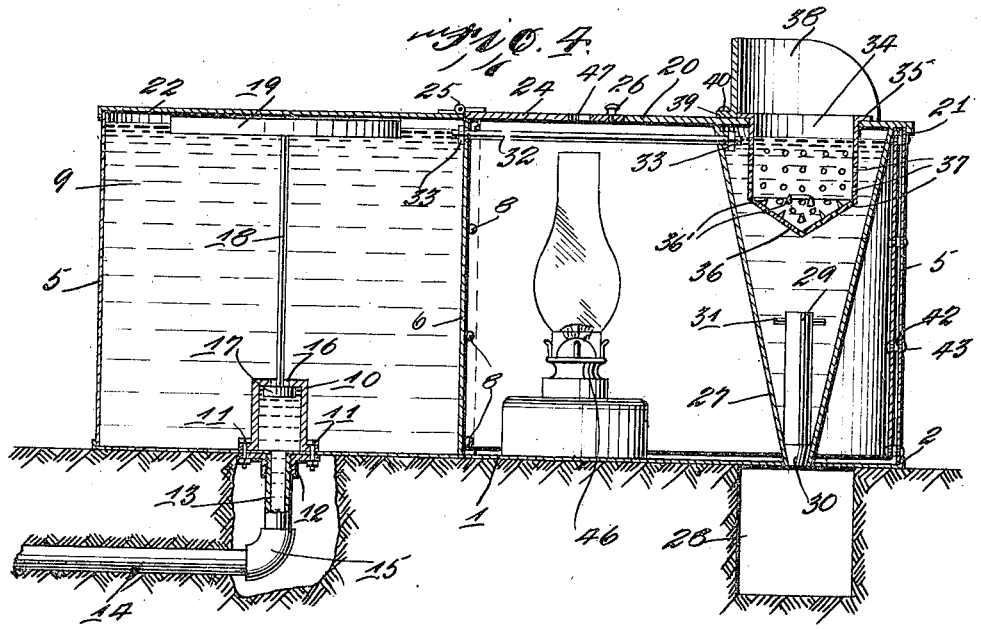
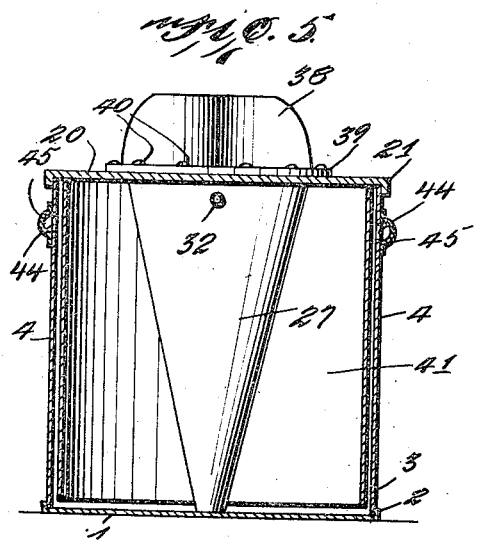
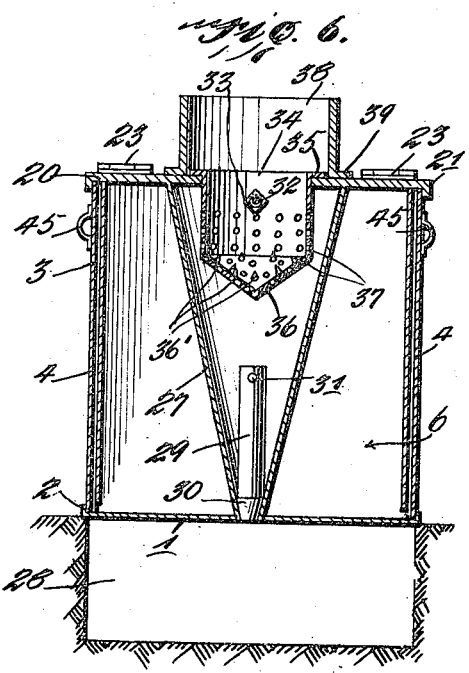
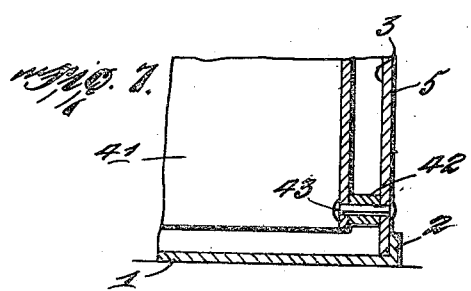
Inventor
R. W. Ryon.

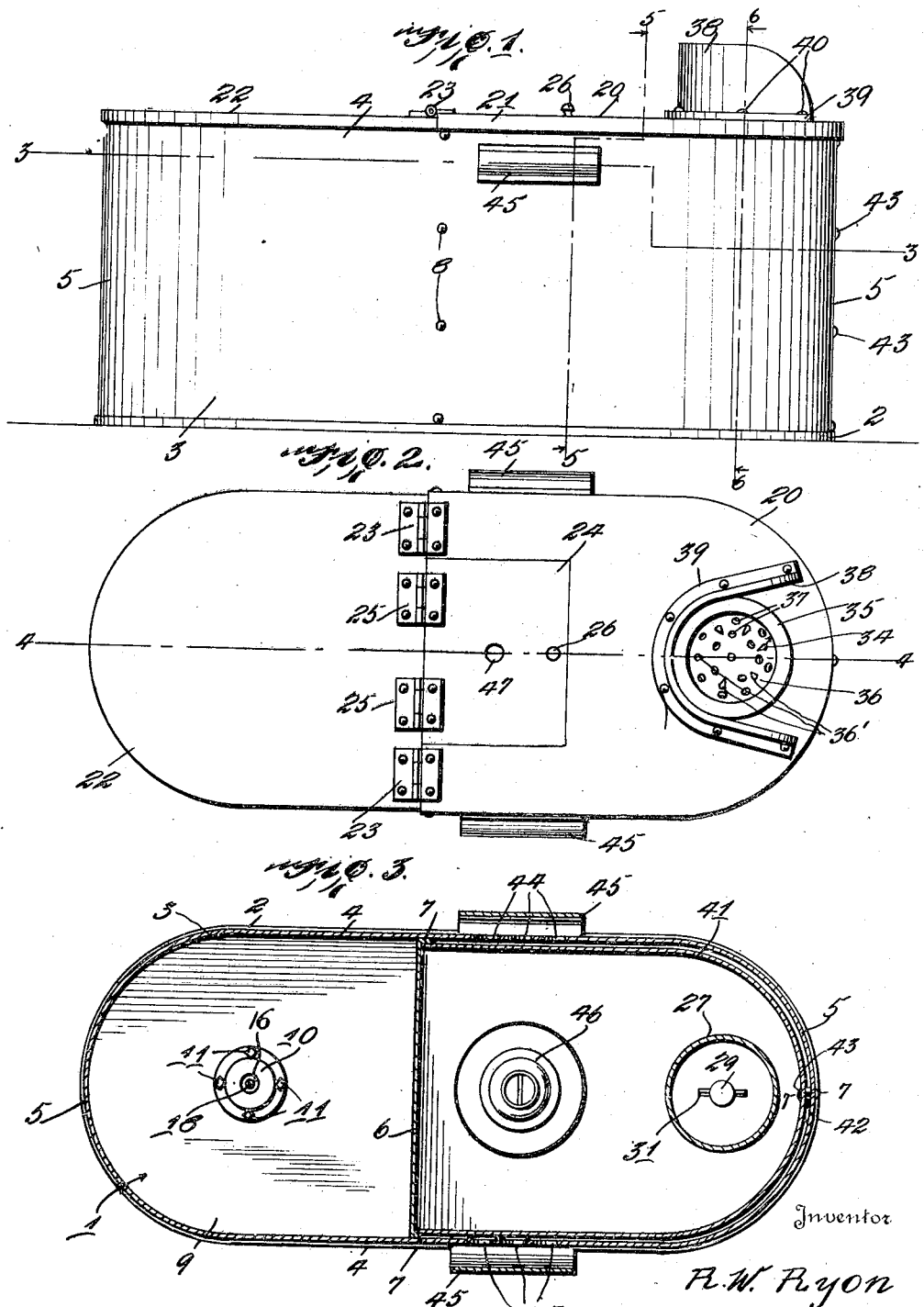

UNITED STATES PATENT OFFICE.

ROBERT W. RYON, OF TALMAGE, KANSAS.

HOG-WATERING APPARATUS.

1,254,937.  Specification of Letters Patent.  Patented Jan. 29, 1918.

Application filed August 16, 1917. Serial No. 186,569.

*To all whom it may concern:*

Be it known that I, ROBERT W. RYON, a citizen of the United States of America, residing at Talmage, in the county of Dickinson and State of Kansas, have invented certain new and useful Improvements in Hog-Watering Apparatus, of which the following is a specification, reference being had therein to the accompanying drawing.

This invention relates to a hog waterer apparatus, and has for its principal object the production of a structure wherein a cone like cylinder is positioned within the casing, whereby the dirt deposited in the drinking cup which depends into the cone will be directed down toward the bottom of the cone, thereby allowing the dirt to be easily dispensed when the plug is removed.

Another object of this invention is the production of a hog waterer apparatus wherein the cup which depends into the cone is provided with a plurality of openings, thereby allowing the water to pass into the cup, although permitting the sediment deposited in the cup by the hog to pass down into the cone, whereby the water within the cup will be free from such sediment.

A still further object of this invention is the production of a hog waterer apparatus, wherein the cup is provided in its lower portion with a plurality of upwardly extending spurs, which are intended to prevent the hog from rooting water from the cup.

A still further object of this invention is the production of a hog waterer apparatus wherein a reservoir is formed within the casing which communicates with the cone, thereby allowing the cone to be automatically supplied with water.

A still further object of this invention is the production of a hog waterer apparatus wherein a heating chamber is formed within the casing, thereby permitting the pipe which connects the reservoir with the cone to be heated for preventing the water within the structure from freezing, this heating chamber being provided with simple and efficient means for supporting the piston.

With these and other objects in view this invention consists of certain novel combinations, constructions, and arrangements of parts as will be hereinafter fully described and claimed.

In the accompanying drawings:—

Figure 1 is a side elevation of the hog waterer apparatus.

Fig. 2 is a top plan view of the hog waterer apparatus.

Fig. 3 is a horizontal, sectional view taken through the structure on the line 3—3 of Fig. 1.

Fig. 4 is a longitudinal, vertical section through the hog waterer apparatus, taken on the line 4—4 of Fig. 2.

Fig. 5 is a transverse vertical section through the structure, taken on the line 5—5 of Fig. 1, looking in the direction of the arrows.

Fig. 6 is a transverse, longitudinal section through the hog waterer apparatus, taken on the line 6—6 of Fig. 1, looking in the direction of the arrows.

Fig. 7 is an enlarged, fragmentary, sectional view, through a portion of the hog waterer apparatus, taken on the line 7—7 of Fig. 3, and illustrating the manner in which the inner wall is held in spaced relation with respect to the outer wall.

Referring to the accompanying drawings by numerals, it will be seen that the hog waterer apparatus comprises an outer casing composed of a bottom 1 having an annular flange 2. The outer wall 3 is continuous comprising sides 4 and ends 5. This outer wall 3 fits upon the bottom 1 and is held against displacement by means of the annular flange 2, as illustrated clearly in Figs. 1 and 4.

A vertical, transverse partition 6 is positioned within the outer casing and this partition 6 has flanges 7 formed thereon which are secured by bolts 8 to the sides 4 of the outer wall 3. In this manner it will be seen that a water reservoir 9 is formed adjacent one end of the outer casing. In order to supply the reservoir 9 with water there is provided a valve housing 10, which is held in position by means of the bolts 11 passing through the lower portions of the valve housing 10, as shown clearly in Fig. 4. These bolts 11 also support upon the bottom 1 of the outer casing a collar 12. A short pipe 13 is connected to the water main 14 by the elbow 15. As a consequence, it will be seen that water will pass from the main 14, through the elbow 15 to the pipe 13, and into the valve housing 10. As this valve housing 10 is provided with a reduced opening 16 in its top portion it is obvious water will pass into the reservoir 9 for filling the same.

In order to limit the passage of the water into the reservoir, it is necessary to provide a valve structure, as shown in Fig. 4. The valve 17 is positioned within the valve housing 10 and has a vertical valve stem 18 projecting therefrom which is secured at its upper end to the float 19. As this float 19 floats upon the water at the surface thereof it is obvious that when the reservoir 9 is nearly filled, as shown in Fig. 4, the stem 18 will draw the valve 17 into engagement with the inner top portion of the valve housing 10, thereby cutting off the passage of water through the opening 16. Of course, as water is used from the reservoir 9 the float 19 will be lowered so as to permit the valve 17 to move from the opening 16 thereby permitting a fresh supply of water to pass into the reservoir 9.

A cover 20 is positioned upon the upper portion of the outer wall 3 and has a depending flange 21 formed thereon which overhangs the outer surface of the wall 3 for holding the cover against accidental displacement.

The lid 22 is secured by means of hinges 23 to the cover 20, whereby the lid 22 is pivotally supported. This lid 22 is adapted to be swung down over the water reservoir 9 for inclosing the same, as shown in Figs. 1, 2, and 4. It will further be noted that the cover 20 is provided with a door 24 extending thereinto, as shown clearly in Fig. 2, this door 24 being secured by hinges 25 to the lid 22. This door 24 is provided with a knob 26. It is obvious that when so desired the door may be moved to an open position for permitting access into the interior of the heating chamber to be hereinafter described.

The inverted cone 27 constitutes the container which is positioned within the outer casing at the end opposite to that in which the water reservoir 9 is formed. This inverted cone 27 is formed upon the cover 20, while its tapered lower end projects through the bottom 1 to communicate with the pit 28. A plug 29 having a tapered lower end 30 removably fits in the lower portion of the inverted cone 27 for preventing the accidental drainage of water from this cone. By having the pins 31 extending through the upper end of the plug 29 it is obvious that when so desired the plug may be lifted from the lower portion of the cone 27 for permitting the cone to be emptied of sediment and water carried therein. The connecting pipe 32 extends into the water reservoir 9 and also the cone 27, being held in a set position by means of the retaining nuts 33. This pipe 32 projects through the heating chamber to be hereinafter described and, therefore, provides the cone 27 with water supplied from the water reservoir 9.

The cup 34 depends through the cover 20 and is held against downward movement by means of the retaining flange 35 fitting upon the top surface of the cup 34. This cup 34 has an inverted cone-like lower portion 36 so as to cause sediment deposited therein to move down into this cone-like lower end 36. The cup 34 is provided with a plurality of reduced openings 37, thereby permitting the water level of the cup 34 to be equal to the water level within the inverted cone 27. Of course, the sediment or refuse deposited within the cup 34 when the hog is drinking will settle in the lower portions of the cup and will then pass through the reduced openings 37 into the cone 27. The spurs 36' will engage the hog's nose to keep him from rooting the inner face of the cup 34. By reason of the sediment collecting in the bottom of the cup 34 the water in cone 27 will be kept comparatively clean.

When it is desired to remove the refuse or sediment from the inverted cone 27, the plug 29 may be removed, as herein disclosed, and thereby permit the refuse to pass from the cone into the pit 28. It is, of course, obvious by referring to the foregoing description that the cup 34 is removable, thereby allowing free access to the plug 29.

In order to prevent a hog from stepping into the cup 34 with its feet, a vertically extending U-shaped shield 38 is carried by the cover 20. This shield 38 is provided with an outwardly extending flange 39 through which rivets 40 pass for fixedly mounting the shield 38 in position upon the cover 20. This shield 38 is open adjacent one end of the outer casing, as shown clearly in Fig. 2, thereby permitting the hog to have access to the interior of the cup 34, although it will be impossible for the hog to step into the cup.

The inner wall 41 is substantially U-shaped, as shown clearly in Fig. 3, having its ends fitting against the partition 6. The rivets 8 which secure the partition in a set position within the casing also pass through the inner wall 41, thereby anchoring the ends of the inner wall upon the flange 7 of the partition 6. In this manner it will be seen that the ends of the inner wall 41 will be spaced from the inner surface of the outer wall 3. In order to retain the inner wall in spaced relation with respect to the inner end of the outer wall 3, as shown in Figs. 3 and 4, spacing blocks 42 are interposed between the inner and outer walls, thereby permitting the retaining rivets 43 to pass through the inner and outer walls and the spacing blocks 42, thus permanently holding the inner wall in spaced relation with respect to the inner surface of the outer wall 3. It will be noted by referring particularly to Figs. 4 to 7 inclusive that the lower edge of the inner wall 41 is spaced above the bottom edge of the outer casing, for allowing the free passage of air around the lower edge of this inner wall.

It will be noted that the outer wall 3 is provided with a plurality of enlarged openings 44 whereby air may pass from the outer atmosphere through the openings 44 into the space between the inner and outer walls. This air will then pass around under the lower edge of the inner wall into the interior of the heating chamber. In order to prevent the wind from blowing directly through the enlarged openings 44 an elongated shield 45 is permanently secured upon each side 4 of the outer wall 3. These shields 45 are elongated and have their ends open, thereby permitting the wind to pass into the shields and then through the openings 44. A lamp 46 or other suitable heating element is positioned within the heating casing, resting upon the bottom 1 thereof, as shown clearly in Fig. 4. It will be noted that the door 24 is provided with an opening 47 directly above the lamp 46, thereby permitting a draft to pass through the heating casing for supporting combustion. As the lamp 46 is positioned directly beneath the pipe 32 it is obvious that the heat imparted by the lamp to the pipe will cause the water passing through this pipe to be heated. In this manner, as only a small quantity of water is passed into the inverted cone structure, it will be seen that even in freezing weather the water will be heated as it passes into the cone, thus preventing the freezing of the water.

It is obvious that if so desired the apparatus may be banked in by dirt so as to prevent any action of the freezing atmosphere upon the water carried within the water reservoir 9. Owing to the openings formed in the top of the apparatus it is obvious that access may be had into the interior even though the apparatus is banked in as above suggested.

From the foregoing description it will be seen that a very efficient hog waterer apparatus has been provided which is capable of use at all seasons of the year, wherein only a small quantity of water is provided at the place where the hog drinks, thus preventing a great quantity of water from being in position to receive deposits of refuse or sediment as the hog drinks. Further, it will be seen that the provision of a cone and float therefor will permit the apparatus to be easily cleaned and the refuse deposited in the cup, while the provision of the spurs in the cup prevent the hog from rooting the water therefrom as it drinks. It is further obvious that by the provision of the heating chamber above described the water will be prevented from freezing during cold weather, while the provision of the spaced inner wall will permit air to be injected into the interior of the heating chamber for supporting combustion without a draft which would extinguish the lamp.

What is claimed is:—

1. In a hog waterer apparatus of the class described, the combination of an outer casing, a reservoir formed within said casing, means for supplying said reservoir with water, an inverted cone like container carried within said casing, means for closing the lower end of said container, a cup positioned within said container, said cup being provided with a plurality of openings, means for supplying said container with water from said reservoir, whereby the water level in said cup will be equal to the water level of said container, and the openings of said cup being adapted to permit sediment and refuse to pass from the cup into said container.

2. In a hog waterer apparatus of the class described, the combination of an inverted cone like container, means for removably closing the bottom of said container, a cup extending into said container, said cup having a plurality of openings, means for supplying said container with water, whereby the water level of said cup will be equal to the water level of said container, said openings permitting refuse deposited therein when the hog is drinking to pass into said cone-like container, the incline of the cone-like container causing the refuse to settle in the bottom of the container, whereby when so desired the bottom of said container may be opened so as to permit the refuse to pass therefrom.

3. In a hog waterer apparatus of the class described, the combination of a container, means for supplying said container with water, a cup extending into said container, said cup having openings, thereby permitting said cup to receive water from said container, and spurs carried within said cup for preventing a hog when drinking from rooting the water from said cup.

4. In a hog waterer apparatus of the class described, the combination of an outer casing, a partition carried by said casing, thereby forming a water reservoir, an inner wall positioned within said casing, means for spacing said inner wall from the inner surface of said casing, said casing having a plurality of openings formed therein, whereby air may be passed into said openings and into the space between said casing and said inner wall, the lower edge of said inner wall being spaced from the bottom of said casing, whereby air may pass around within said inner wall for supporting combustion.

In testimony whereof I hereunto affix my signature.

ROBERT W. RYON.

Copies of this patent may be obtained for five cents each, by addressing the "Commissioner of Patents, Washington, D. C."